United States Patent [19]
Redelius

[11] Patent Number: 5,256,195
[45] Date of Patent: Oct. 26, 1993

[54] BITUMEN EMULSION, PROCESS FOR ITS PREPARATION, BREAKING ADDITIVE FOR USE THEREIN AND THE USE OF SAID BITUMENT EMULSION

[75] Inventor: Per G. Redelius, Nynäshamn, Sweden

[73] Assignee: AB Nynas Pftroleum, Johanneshov, Sweden

[21] Appl. No.: 801,369

[22] Filed: Dec. 2, 1991

[30] Foreign Application Priority Data

Dec. 19, 1990 [EP] European Pat. Off. ........ 90850415.2

[51] Int. Cl.$^5$ ............................................. C09D 195/00
[52] U.S. Cl. .................................... 106/277; 252/312
[58] Field of Search .................... 106/277; 252/312

[56] References Cited

U.S. PATENT DOCUMENTS

| | | | |
|---|---|---|---|
| 3,257,231 | 6/1966 | McEachran et al. | 106/277 |
| 3,513,005 | 5/1970 | Bradshaw et al. | 106/277 |
| 4,745,154 | 5/1988 | Ruffner | 524/801 |
| 4,786,679 | 11/1988 | Wetegrove et al. | 252/312 |

FOREIGN PATENT DOCUMENTS

0367838 5/1990 European Pat. Off. .
1478039 3/1967 France .

*Primary Examiner*—David Brunsman
*Attorney, Agent, or Firm*—Lowe, Price, LeBlanc & Becker

[57] ABSTRACT

A bitumen emulsion of anionic or cationic type having a breaking additive is disclosed. The breaking additive comprises a water-in-oil emulsion wherein an aqueous solution of a substance which has a neutralizing effect upon the bitumen emulsion when added thereto is dispersed in an oil continuous phase.

The bitumen emulsion is prepared by a) preparing an aqueous solution of a neutralizing substance,
b) emulsifying the aqueous solution of a) in oil to form an invert emulsion, and
c) mixing the invert emulsion of b) into a bitumen emulsion of anionic or cationic type.

The bitumen emulsion can be used as a binder in road building or road maintenance or in construction work.

14 Claims, No Drawings

BITUMEN EMULSION, PROCESS FOR ITS PREPARATION, BREAKING ADDITIVE FOR USE THEREIN AND THE USE OF SAID BITUMENT EMULSION

The present invention relates to a bitumen emulsion, a process for its preparation, a breaking additive for use in said bitumen emulsion and the use of said bitumen emulsion. More particularly the present invention relates to a bitumen emulsion of anionic or cationic type having a breaking additive and to a breaking additive for use in said bitumen emulsion as well as to the use of said bitumen emulsion as a binder in road building or road maintenance or in construction work.

Bitumen emulsions have been used for more than 70 years. The main use of bitumen emulsions is within road building and road maintenance but bitumen emulsions have also found extensive use within other fields such as roofing in building industry. During the last 15 to 20 years there has been a substantial increase in the use especially for road purposes.

The emulsions can be classified in different types depending upon what type of emulsifier has been used to emulsify the bitumen, e.g. anionic, cationic, non-ionic and amphoteric emulsions. In the earliest emulsions anionic emulsifiers were exclusively used, usually soaps of long-chain fatty acids. These systems had the disadvantage that the adhesion to stone material was rather poor. About 20 years ago cationic emulsifiers, fatty acid amines, appeared on the market at a low price. This laid the foundation to the great increase in the use of bitumen emulsions during the last 15 years.

Bitumen emulsions of the cationic type have to a large extent replaced the use of cutbacks in connection with roads. This has resulted in a substantial reduction in the emission of oil and solvents to the air. The advantages of emulsions in this connection is that they, when compared to cutbacks, quickly form a binding agent of good tenacity and that they give a good adherence to stone material.

The use of bitumen emulsions, however, has been limited to some specific fields of use due to the fact that they show some disadvantages, namely a) they are sensitive to rain and b) it takes a comparatively long time before the binding agent has developed full strength.

The different types of bitumen emulsions differ in their breaking properties, i.e. the breaking of the emulsion and the curing thereof. The mechanisms for the breaking of the emulsions differ depending upon the type of emulsion. However, it has always been desirable to control the breaking of the emulsions.

In literature a great number of methods for the breaking of anionic as well as cationic emulsions by means of additives have been presented.

Breaking of anionic emulsions by means of additives can be performed in several in point of principle different ways. Some ways suggested in literature are the following:

Addition of lime (calcium hydroxide), gypsum or salts of polyvalent metals.

Addition of cationic emulsifiers.

Adjustment of the pH-value by the addition of organic or inorganic acids.

Breaking of cationic emulsions may be performed in the following ways:

Addition of anionic emulsifiers.

Addition of polyvalent metal ions or polyvalent inorganic anions.

Adjustment of the pH-value by the addition of bases.

Addition of different types of filler or aggregate fines, or Portland cement.

The above methods exist in a great number of variations. However, they all suffer from one great disadvantage, viz. breaking occurs instantaneously when the additive comes into contact with the emulsion. Accordingly the fields of use are considerably restricted.

In order to increase the usefulness of bitumen emulsions the breaking has to be controlled in such a way that it is delayed but at the same time very rapid once it is occuring.

Some methods for the controlled delayed breaking of bitumen emulsions have been suggested in literature. Thus, for instance, Swedish Patent No. 8701292-8 (publication No. 453 760) discloses a method wherein the breaking additive is enclosed in microcapsules. The incapsulating of the breaking additive, however, is a comparatively expensive procedure which adds considerably to the overall costs of the bitumen emulsion so that it becomes uneconomical.

Accordingly, it is an object of the present invention to provide a bitumen emulsion having a breaking additive which emulsion is easily prepared at low cost and is broken in a controlled way so that breaking is delayed but rapid once it has started.

It is another object of the invention to provide a cheap and simple method for preparing a bitumen emulsion having a breaking additive, which emulsion is broken in a controlled way so that breaking is delayed but rapid once it has started.

It is a further object of the present invention to provide a breaking additive to bitumen emulsions, which additive is easily prepared at low cost and is able to break the bitumen emulsion in a controlled way so that breaking is delayed but rapid once it has started.

These and other objects are achieved by means of the present invention.

The present invention is based on the principle of preparing an aqueous solution of a neutralizing substance, then emulsifying the aqueous solution in oil in such a way that an oil continuous phase (a so-called invert emulsion) is obtained and finally mixing the invert emulsion into the bitumen emulsion. The mixing of the invert emulsion into the bitumen emulsion is carried out shortly before the use of the bitumen emulsion. After a short time which is defined by the amount and composition of the additive the bitumen emulsion is breaking and develops rapidly a good ability to bind to stone material.

Thus according to the invention there is provided a bitumen emulsion of anionic or cationic type having a breaking additive, which bitumen emulsion is characterized in that the breaking additive has been supplied to the emulsion in the form of a water-in-oil emulsion wherein an aqueous solution of a neutralizing substance is dispersed in an oil continuous phase.

The term "neutralizing substance" as used here and in the claims designates a substance which when added to the primary bitumen emulsion of anionic or cationic type causes the pH-value of said emulsion to move in the direction against the point of neutrality (pH 7) but not necessarily to reach or stay at said point. Thus, for instance, in case of an emulsion of the anionic type, which has a pH-value, on the alkaline side of the point of neutrality, the addition of the neutralizing substance can lead to a final pH-value of above the point of neutrality as well as to a pH-value beneath said point as long as the addition leads to a breaking of the emulsion.

According to one embodiment of the bitumen emulsion according to the present invention the bitumen emulsion is an anionic emulsion and the neutralizing substance is an acid or an acid salt which acid or salt is soluble in water but sparingly soluble or insoluble in oil.

Examples of substances to be used as the neutralizing substance in this connection are organic acids such as citric acid, ascorbic acid, benzoic acid, succinic acid and oxalic acid; inorganic acids such as boric acid; and acid salts such as potassium hydrogen phthalate, sodium hydrogen sulphate, potassium hydrogen sulphate and sodium dihydrogen phosphate.

For the oil phase the selection of the oil is not critical. Thus most types of hydrophobic liquids can be used including mineral oils and solvents of the type petroleum naphtha (kerosine, white spitit, etc.).

On the other hand the selection of emulsifier for emulsifying the solution of the neutralizing substance in the oil appears critical. The emulsifier should be of the non-ionic type and have a HLB-value (Hydrophilic-Lipophilic Balance; for definition, vide e.g. W.C. Griffin, J. Soc. Cosmet. Cem. 5 (1954) 24 or Das Atlas HLB System (1968), Atlas Chemie GmbH, Essen, Germany) within the range of from 3-9, preferably 5-7. An example of a useful emulsifier in this connection is the product sold by ICI Europe Ltd, Kortenberg, Belgium, under the trade name Hypermer A60. Mixtures of two or more non-ionic emulsifiers may also be used provided that the HLB-value of the mixture is within the range set forth above.

According to another embodiment of the bitumen emulsion according to the present invention the bitumen emulsion is a cationic emulsion and the neutralizing substance is an organic base, a basic salt of an organic or inorganic acid or an alkali metal hydroxide, which base, salt or hydroxide is soluble in water but sparingly soluble or insoluble in oil.

Examples of substances to be used as the neutralizing substance in this connection are organic bases such as low molecular amines, e.g. monoethanolamine, diethanolamine, triethanolamine, aminopropanol, etc.; basic salts of organic acids, e.g. trisodium citrate; basic salts of inorganic acids such as sodium carbonate, sodium borate, sodium silicate, ttisodium phosphate, etc.; and alkali metal hydroxides such as sodium or potassium hydroxide.

The oil for the oil phase of the breaking additive and The emulsifier for emulsifying the neutralizing substance in said oil can be selected as indicated above in connection with the bitumen emulsion of the anionic type.

The invention also provides a breaking additive for use in a bitumen emulsion according to the invention, which breaking additive comprises a water-in-oil emulsion, wherein an aqueous solution of a substance which has a neutralizing effect upon the bitumen emulsion when added thereto is dispersed in an oil continuous phase.

According to one embodiment of the breaking additive of the invention which is intended to be used in a bitumen emulsion of the anionic type the neutralizing substance is an acid or an acid salt, which acid or salt is soluble in water but sparingly soluble or insoluble in oil.

According to another embodiment of the breaking additive of the invention which is intended to be used in a bitumen emulsion of the cationic type the neutralizing substance is an organic base, a basic salt of an organic or inorganic acid or a hydroxide, which base, salt or hydroxide is sparingly soluble or insoluble in oil.

Examples of neutralizing substances to be used in these two embodiments of the breaking additive are given in connection with the embodiments of the bitumen emulsion according to the invention mentioned above.

The oil for the oil phase and the neutralizing substance in said oil is selected as discussed above in connection with the bitumen emulsion according to the invention.

The invention also provides a process for the preparation of the bitumen emulsion according to the invention, which process is characterized in a) preparing an aqueous solution of a neutralizing substance, b) emulsifying the aqueous solution of a) in oil to form an invert emulsion and c) mixing the invert emulsion of b) into a bitumen emulsion of anionic or cationic type.

Step c) is carried our shortly before the use of the bitumen emulsion, In this step the breaking additive, i.e. the invert emulsion obtained in step b) is mixed directly into the bitumen emulsion. The more effective the dispersing is the faster is the onset of the breaking.

When applying this technique to anionic bitumen emulsions a direct breaking of the emulsion under liberation of water is generally obtained. In case of cationic emulsions the breaking of the emulsion may occur in two different ways. Either a direct breaking of the emulsion is occurring or an inversion of the bitumen emulsion is obtained. The latter reaction is characterized in that it is comparatively rapid once it has started and in that it does not lead to immediate liberation of water.

The invention also relates to the use of the bitumen emulsion according to the invention as a binder in road building or road maintenance or in construction work, such as roofing, coating and water-proofing.

Tests have shown that a good strength of the binder can be attained in less than 10 minutes after mixing the breaking additive and the bitumen emulsion together. The construction may be made completely insensitive to rain after about 30 minutes.

The delay in breaking of the emulsion may be varied by varying the amount and the composition of the breaking additive or by varying the effectiveness of the dispersing. Suitable amounts and compositions for different purposes and effects may easily be established in a series of experiments. However, in general the amount of the breaking additive will be 1 to 10, preferably 1,5-6, especially 2-4% by weight calculated on the weight of the final bitumen emulsion.

The bitumen emulsions of the present invention preferred at present are those of the cationic type in which the neutralizing substance of the breaking additive is an easily available water-soluble basic salt of an inorganic acid, e.g. sodium carbonate, or of an organic acid, e.g. trisodium citrate.

The invention will now be further illustrated by means of a number of non-limiting working examples. All percentages given in the examples are given by weight unless otherwise indicated.

EXAMPLE 1

An anionic bitumen emulsion was produced in a laboratory colloid mill (Super Dispax 5041). For the aqueous phase of the emulsion an aqueous solution of 1,14% emulsifier EN 741 from Akzo AB, Gothenburg, Sweden, was used. The pH-value of the solution was adjusted to 11,5 by means of NaOH.

The aqueous solution was heated to 50° C. The colloid mill was started and bitumen (standard quality B 180 from AB Nynäs Bitumen, Nynäshamn, Sweden) was added very slowly. The bitumen had a temperature of approximately 140° C. The aqueous solution and the bitumen was mixed in such a ratio that the bitumen content of the emulsion formed was 65%. This product will in the following be referred to as "the primary bitumen emulsion".

Another emulsion was produced by slowly adding a solution of 25% citric acid in water to a 1,6% solution of an emulsifier Hypermer A60 (commercial product from ICI Europe Ltd, Kortenberg, Belgium) in a hydrotreated naphthenic oil (standard quality Nytex 800 from Nynäs Naphthenics AB, Nynäashamn, Sweden) at ambient temperature under vigorous stirring. Mixing was carried out in a ratio such that the final product was a 60% water-in-oil emulsion. This product was used as a breaking additive as follows.

The primary bitumen emulsion was mixed with 4% (calculated on the primary bitumen emulsion of breaking additive at ambient temperature in a beaker and stirred by hand with a glass rod. The emulsion broke after 1,5 min. A corresponding emulsion with no breaking additive used as a reference was not broken after several hours (no continous stirring).

EXAMPLE 2

In this experiment the bitumen emulsion and the breaking additive of Example 1 were used.

To simulate a surface dressing for roads, a tin lid (diameter 200 mm) was used. Immediately prior use 4% (calculated on the primary bitumen emulsion) breaking additive was mixed with 50 g of primary bitumen emulsion. The mix was stirred by hand using a glass rod for about 10 sec. and then poured onto the lid, followed by 400 g aggregates (Farsta granite 12-16 mm unwashed material). The emulsion was broken after 5 min. A reference lid treated analogously but with an emulsion with no breaking additive showed no breaking after 2 h.

EXAMPLE 3

In this experiment a cationic polymer modified bitumen emulsion (PME 90 from the full scale production of AB Nynäs Bitumen, Nynäashamn, Sweden) was used. The polymers were a blend of commercial block copolymers of the types styrene-butadiene-styrene (SBS) and styrene-iso-prene-styrene (SIS). The total amount of polymer in the bitumen was 4,5%.

The breaking additive was a reversed emulsion with an oil phase consisting of a 2,3% solution of the emulsifier Hypermer A60 in Nytex 800. The aqueous phase consisted of a 10% solution of sodium carbonate in water. The water in oil emulsion was produced by slowly pouring the aqueous phase into the oil phase during vigorous mixing. The final breaking additive is a water-in-oil emulsion comprising 63% by weight of water.

2% of breaking additive was added to PME 90 in a cup. Upon stirring with a glass rod the emulsion started to break to the walls of the cup after 1 min. After 5 min the emulsion had inverted (looked like completely broken emulsion).

EXAMPLE 4

In this experiment the bitumen emulsion and the breaking additive of Example 3 were used.

A fresh preparation of 4,6% (calculated on the bitumen emulsion) breaking additive in 50 g of bitumen emulsion PME 90 was poured onto a tin lid. 400 g aggregates (Farsta granite 12-16 mm unwashed) were used. After 10 min the aggregates were stuck. The lid was washed with water. No emulsion was washed away.

A reference lid with emulsion PME 90 without any breaking additive was washed almost clean using water after 10 min.

EXAMPLE 5

In this test a Spinn Test equipment was used. Spinn test is a test for determination of the retaining strength for aggregates as a function of time. It consists of an electric motor with variable speed connected to a rotating disc. A simulated surface dressing is applied on a round plate which is cut out from a roofing membrane. The disc is covered with ~90 g emulsion followed by ~430 g aggregates (Farsta granite, washed and harpsieved 12-16 mm in size). The disc is cured in room temperature. After the curing period the disc is mounted on the rotating disc. The disc is spun for a selected speed in 30 sec. The stone loss (measured as weight loss) is determined. The retaining force for the aggregate is calculated.

Three different additives were made for this test:

Additive 1. Aqueous phase: 15% sodium carbonate in water. Oil phase: 0,7% alkyl polyglycol ether, 0,5% polyglycol ester, 0,2% Hypermer A60, 0,5% sorbitane monooleate, all these are emulsifiers dissolved in Nynäs oil Nytex 800. The water-in-oil emulsion consists of 50% aqueous phase and was produced with the aid of an Ultra turrax high speed mixer.

Additive 2. Aqueous phase: 30% Trisodium citrate in water. Oil phase: 4% Hypermer A60 in Nytex 800. The water-in-oil emulsion consisted of 50% aqueous phase and was produced with the Ultra turrax mixer.

Additive 3. Aqueous phase: 18% trisodium citrate and 6% sodium carbonate in water. Oil phase: 4% Hypermer A60 in Nytex 800. The water-in-oil emulsion consisted of 70% aqueous phase and was produced with the Ultra turrax mixer.

In all tests the polymer modified bitumen emulsion PME 90 was used.

Spinn Test Results:

The additives were added to the emulsion and mixed with a glass stirrer immediately prior to application on the test disc.

The first test was made after 30 min curing of the sample.

| Sample | Strength after a curing time of: | | | |
| --- | --- | --- | --- | --- |
| | 30 min | 1 h | 2 h | 4 h |
| PME + 4% add. 1 | 2 N | 6 N | 8 N | 10 N |
| PME + 2% add. 2 | 16 N | 16 N | 16 N | 16 N |
| PME + 3% add. 3 | 16 N | 16 N | 16 N | 16 N |
| PME without add. | 0 N | 0 N | 1 N | 2 N |

I claim:

1. A bitumen emulsion of the anionic or cationic type containing a breaking additive, said breaking additive being in the form of a water-in-oil emulsion comprising an aqueous solution of a neutralizing substance dispersed in an oil continuous phase by means of a non-ionic emulsifier.

2. A bitumen emulsion according to claim 1, wherein the bitumen emulsion is an anionic emulsion and the neutralizing substance is an acid or an acid salt, which acid or salt is soluble in water but sparingly soluble or insoluble in oil.

3. A bitumen emulsion according to claim 1, wherein the bitumen emulsion is a cationic emulsion and the neutralizing substance is an organic base, a basic salt of an organic or inorganic acid or an alkali metal hydroxide, which base, salt or hydroxide is soluble in water but sparingly soluble or insoluble in oil.

4. A bitumen emulsion according to claim 1, wherein the neutralizing substance is emulsified in a mineral oil.

5. A bitumen emulsion according to claim 1, wherein the neutralizing substance is emulsified in petroleum naphtha.

6. A breaking additive that is useful in a bitumen emulsion of the anionic type, which breaking additive comprises a water-in-oil emulsion comprising an aqueous solution of an acid or an acid salt dispersed in an oil continuous phase by means of a non-ionic emulsifier, said acid or salt being soluble in water but sparingly soluble or insoluble in oil.

7. A breaking additive according to claim 6, wherein said acid or acid salt is emulsified in a mineral oil.

8. A breaking additive for use in a bitumen emulsion of the cationic type, which breaking additive comprises a water-in-oil emulsion comprising an aqueous solution of an organic base, a basic salt of an organic or inorganic acid or an alkali metal hydroxide dispersed in an oil continuous phase by means of a non-ionic emulsifier, said base, salt or hydroxide being soluble in water but sparingly soluble or insoluble in oil.

9. A breaking additive according to claim 8, wherein said organic base, basic salt or hydroxide is emulsified in a mineral oil.

10. A process for the preparation of a bitumen emulsion which process comprises
(a) preparing an aqueous solution of a neutralizing substance,
(b) emulsifying said aqueous solution of neutralizing substance in oil by means of a non-ionic emulsifier to thereby form an invert emulsion, and
(c) mixing the invert emulsion resulting from step (b) into a bitumen emulsion of the anionic or cationic type.

11. The process of claim 10, wherein the bitumen emulsion is an anionic emulsion and the neutralizing substance is an acid or an acid salt, which acid or salt is soluble in water but sparingly soluble or insoluble in oil.

12. The process of claim 10, wherein the bitumen emulsion is a cationic emulsion and the neutralizing substance is an organic base, a basic salt of an organic or inorganic acid or an alkali metal hydroxide, which base, salt or hydroxide is soluble in water but sparingly soluble or insoluble in oil.

13. The process of claim 10, wherein the neutralizing substance is emulsified in a mineral oil.

14. The process of claim 10, wherein the neutralizing substance is emulsified in petroleum naphtha.

* * * * *